J. T. H. WARWOOD.
KILN SYSTEM.
APPLICATION FILED JULY 7, 1917.
1,264,722.
Patented Apr. 30, 1918.
2 SHEETS—SHEET 1.
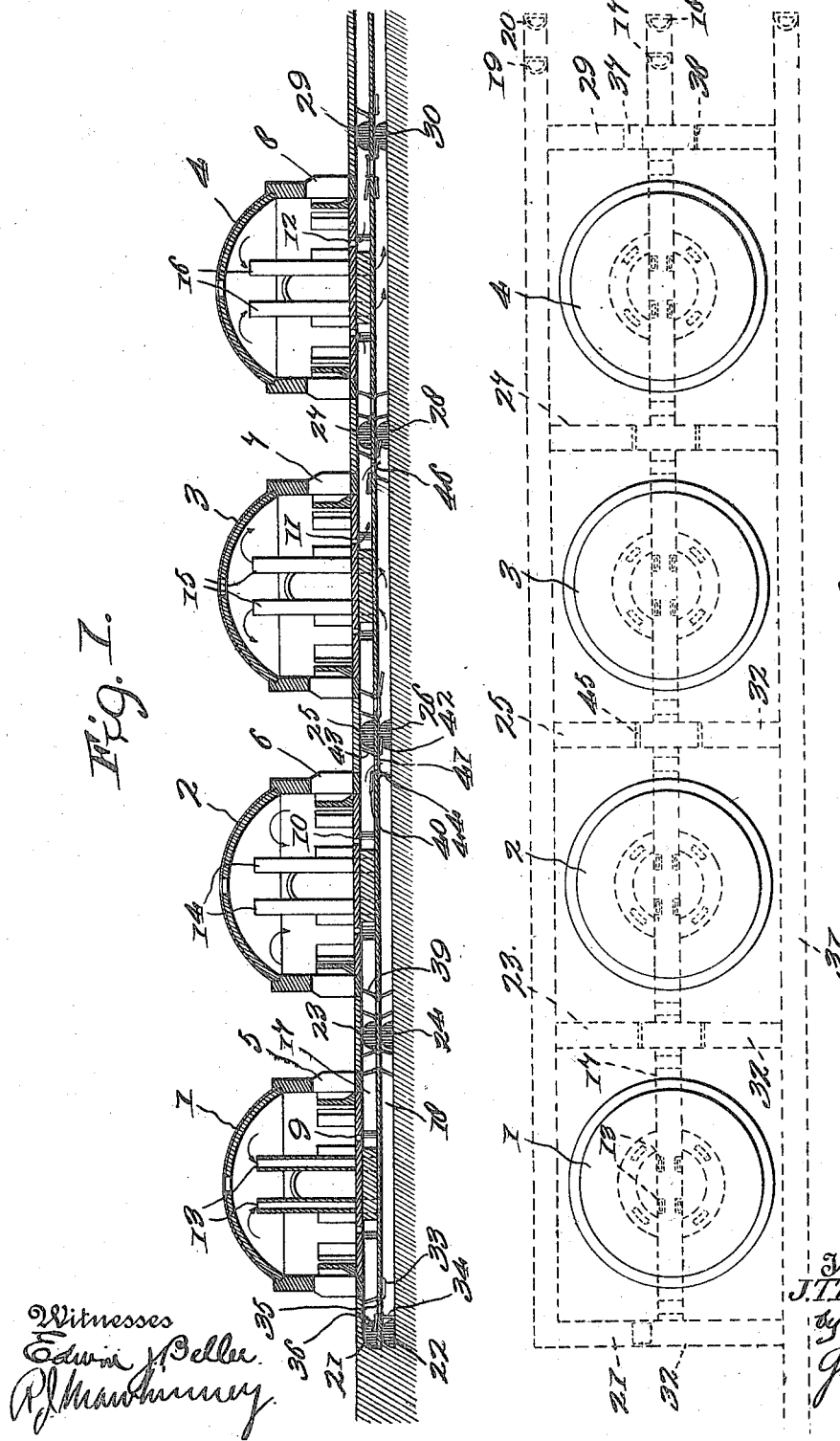

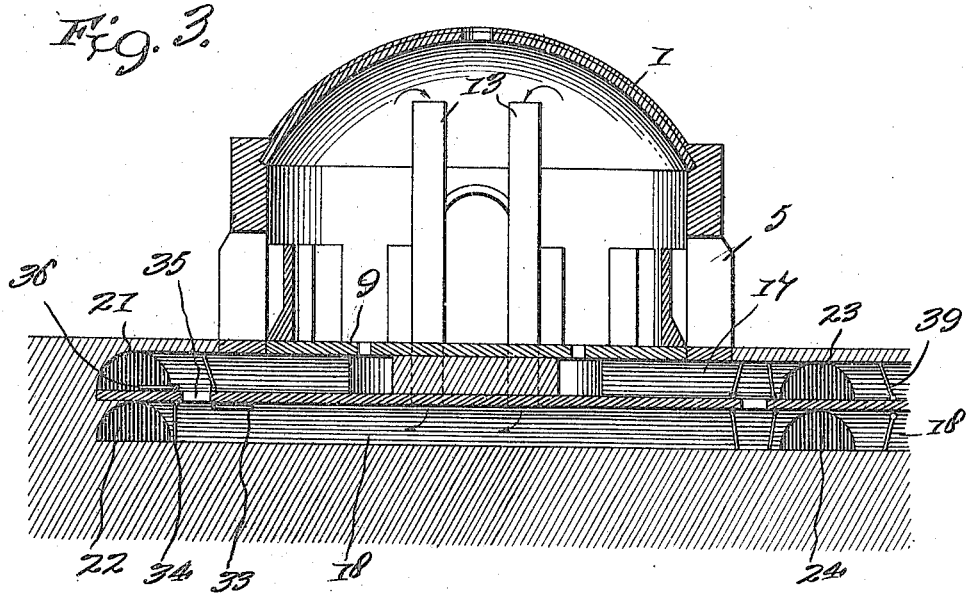
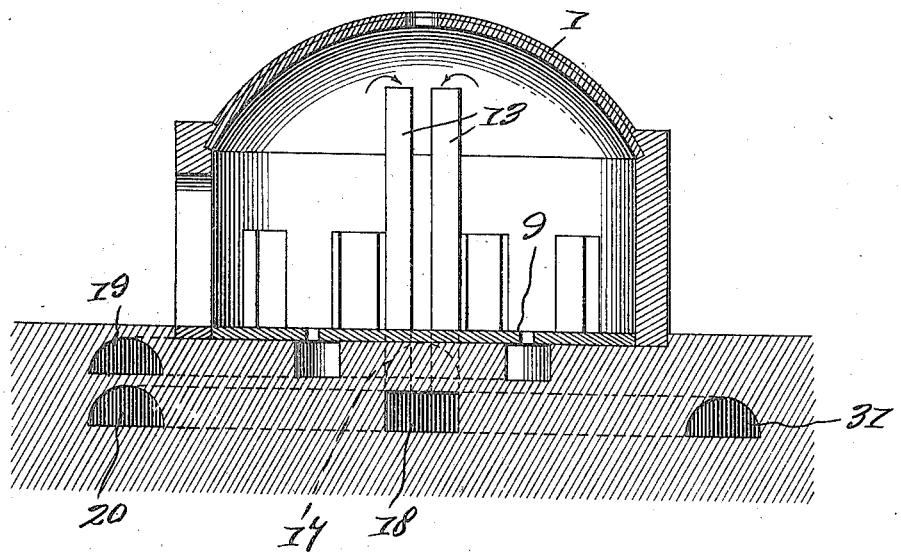

UNITED STATES PATENT OFFICE.

JOSEPH T. H. WARWOOD, OF WADSWORTH, OHIO.

KILN SYSTEM.

1,264,722.  Specification of Letters Patent.  Patented Apr. 30, 1918.

Application filed July 7, 1917. Serial No. 179,203.

*To all whom it may concern:*

Be it known that I, JOSEPH T. H. WARWOOD, a citizen of the United States, residing at Wadsworth, in the county of Medina and State of Ohio, have invented certain new and useful Improvements in Kiln Systems; and I do hereby declare the following to be a full, clear, and exact description of the invention, such as will enable others skilled in the art to which it appertains to make and use the same.

The present invention relates to improvements in kiln systems, and more particularly resides in certain improvements, which will hereinafter more fully appear, over my prior Patent, No. 830,386, granted September 4, 1906, and entitled "Kiln for burning clay products."

It is more particularly the object of the present invention to conserve and utilize the dead or latent heat contained in a kiln, which has been recently fired, and in which the baking of the clay products has been substantially finished and completed; and such dead or latent heat is conveyed in accordance with my invention to a second kiln in the system whence, after giving up a large amount of its heat, it is drawn out through the usual exhaust passage.

It is another object of my present invention to utilize the waste heat that is being generated during the firing of a kiln, and which is ordinarily wasted through the chimney.

My invention more particularly resides in certain passages and dampers in connection with a series of kilns for accomplishing the above-stated results.

In the accompanying drawings forming a part of this application, and in which similar reference symbols indicate corresponding parts in the several views:

Figure 1 is a vertical sectional view through a kiln system constructed in accordance with my present invention;

Fig. 2 is a top plan view of the same;

Figs. 3 and 4 are sectional views through individual kilns, and their associated passages.

Referring more particularly to the drawings, a system embodying my invention may be with advantage built up of the four kilns, shown in Figs. 1 and 2, and designated 1, 2, 3, and 4. Each of these kilns is constructed with fire boxes 5, 6, 7 and 8 respectively, and with arched domes, perforated bottoms or riddles 9, 10, 11 and 12; and removable vertical flues 13, 14, 15 and 16, respectively. All of these above parts may be in accordance with the construction shown and described in my prior patent aforesaid, or may be built up in conformity with any approved construction.

Beneath the series of kilns, which preferably extend in straight lines, are passages 17 and 18 communicating with the various kilns 1, 2, 3, and 4, respectively, through their perforated bottoms 9, 10, 11 and 12, and their vertical flues 13, 14, 15 and 16, all as will be clear from Fig. 1.

Running parallel with the flues 17 and 18 are lateral flues 19 and 20, the latter of which connects with an exhaust fan for producing the usual draft. These lateral flues 19 and 20 are connected with the longitudinal flues 17 and 18, beneath the kilns, by pairs of transverse passages 21, 22; 23, 24; 25, 26; 27, 28; 29, 30. At suitable locations in these various passages are placed dampers, as clearly shown in the drawings, and which will be hereinafter more particularly referred to.

A lateral flue 31 is disposed on the opposite side of the line of kilns, and communicates with either or both the flues 17 and 18, by means of transverse flues 32, through which the waste heat from any one or more of the several kilns may be taken off and conveyed to a drier.

Referring now more particularly to the operation of my improved system, let us suppose that kiln 1 has been already fired by means of fuel in the fire boxes 5, and that it having attained its predetermined heat, such fires have been banked and the baking having gone on for some time, the same is substantially finished and completed. In this state the clay mass within the furnace is at approximately a white heat, at a temperature of substantially 1300° to 2000° F. This heat is ordinarily wasted, though in some cases, it is tken off and conveyed to what is termed a waste heat drier, and for such purposes the transverse passages 32 and the lateral passage 31 have been provided to connect with the several kilns in my improved system.

This dead or latent heat in the kiln 1 is received through the upper end of the removable flues 13, as indicated by the arrows in Fig. 1, through which it descends to the lower longitudinal flue 18, thence passing to the left and past the damper 33, which is opened. The damper 34 is, however, closed so as to obstruct its passage to the lateral flue 22, through which it would otherwise be drawn off to the lower lateral flue 20, and directly to the exhaust fan.

The waste heat, after passing the damper 33, rises through an opening 35 into the upper flue 17, passes the open damper 36 and enters the transverse passage 21, through which it is later delivered to the longitudinal flue 19. This flue 19 carries the waste heat from the kiln 1 to the kiln 4, such waste heat entering through the upper transverse passage 29, as permitted by the damper 37. The opposite damper 38 in the transverse passage 32 prevents such waste heat from being immediately delivered to the lateral flue 31, and escaping to the drier; but compels such waste heat to enter the upper flue 17 beneath the kiln 4.

After getting into this flue 17, the waste heat rises through the perforations in the kiln bottom or riddle 12, as indicated by the arrows in Fig. 1, and after escaping through the clay mass contained therein, is deflected and directed by the curved dome 4 toward the central upper portion of said kiln, from which said waste heat is received into the upper ends of the removable flues 16, and carried thereby downwardly into the lower longitudinal flue 18. The arrows in Fig. 1 show the waste heat issuing from the lower ends of these removable flues 16, and escaping to the right, where it enters the transverse lower passage 30, and is thereby delivered to the lower lateral flue 20 and to the exhaust.

The above action is performed when the kiln 4 is placed in readiness to be started and the initial circulation of the dead or latent heat from the kiln 1 to and through this kiln 4 will have the effect of drawing off the moisture and gases in the clay therein down through the removable flues, and which is commonly known in the art as watersmoking. The heat and steam thus rise through the ware in the kiln 4, and accomplish the drying in a much quicker and more expeditious manner, leaving the ware in a much better condition than when the heat is driven downwardly through the same, as ordinarily done in other processes.

The kiln No. 2 in the series is fired in the usual manner by placing fuel in the fire boxes 6, which fuel is directed through the mass of clay ware, as indicated by the arrows in Fig. 1, thence passing downwardly through the perforations in the bottom 10 and into the upper longitudinal flue 17. The damper 39 being closed, these waste products will be directed toward the right with reference to Fig. 1, as indicated by the arrows therein. Taking their course toward the right in the upper flue 17, these products pass the damper 40, descend through the opening 41, and pass the second open damper 42, thus finding their way into the lower longitudinal passage 18. The dampers 43 and 44 are of course closed, as shown in the drawing, and the damper 45 in the transverse flue 26 is likewise closed to prevent immediate escape of the waste heat products to the exhaust lateral flue 20.

The products then pass along through the lower longitudinal flue 18, to beneath the kiln 3, where they are received through the lower ends of the removable flues 15, and delivered to said kiln through the upper ends of said removable flues in the manner shown by the arrows in Fig. 1. After circulating through the clay ware in the kiln 3, such products pass down through the perforations in the bottom 11, as also indicated by the arrows, and to the right in the passage 17, and down through the opening 46 into the lower flue 18. They then pass through the lateral flue 28, and are sucked out by the exhaust fan connected to the lateral flue 20.

It will be noted that the kilns are substantially alike in construction, each being provided with fire-boxes so that they can be operated separately and independently, and that they may be connected up in various ways by means of the extensive flue system, as constructed in accordance with my invention.

It will be obvious that various modifications might be made in the herein described apparatus and in the construction, combination and arrangement of parts which could be used without departing from the spirit of my invention.

Having thus described my invention, what I claim and desire to secure by Letters Patent of the United States is:

1. In a system of the character described, a series of kilns having fire-boxes, perforated hearths and vertical flues, an upper central longitudinal flue in communication with the several kilns through said perforated hearths, a lower central longitudinal flue in connection with the vertical flues in said kilns, ports setting up communication between said upper and lower central flues, dampers one to each side of the ports in said upper and lower central flues, an upper lateral flue, transverse flues connecting said upper lateral flue with said upper central flue, the transverse flues meeting the upper central flue between said ports and dampers, dampers in said transverse flues, a lower lateral flue connecting with an exhaust, and transverse passages joining said last-named flue with the lower central flue between said ports and dampers, substantially as described.

2. A system of the character described including a series of kilns having fire-boxes, perforated hearths and vertical flues, an upper central longitudinal flue in communication with the several kilns through said perforated hearths, a lower central longitudinal flue in connection with the vertical flues in said kilns, ports setting up communication between said upper and lower central flues, pairs of dampers, one to each side of the ports in said upper and lower central flues, an upper lateral flue, transverse flues connecting said upper lateral flue with said upper central flue, the transverse flues meeting the upper central flue between said ports and pairs of dampers, dampers in said transverse flues, a lower lateral flue connecting with an exhaust, transverse passages joining said last-named flue with the lower central flue between said ports and pairs of dampers, and a third lateral flue connecting with a drier, and being in communication with one of said central flues, substantially as described.

In testimony whereof, I affix my signature.

JOSEPH T. H. WARWOOD.

Copies of this patent may be obtained for five cents each, by addressing the "Commissioner of Patents, Washington, D. C."